3,407,218
PROCESS FOR THE PREPARATION OF 17-ALPHA-HYDROXY-PROGESTERONE HEPTYLATE
Jean Marie Gastaud, 3 Ave. Prince Pierre, Monaco
No Drawing. Filed June 7, 1965, Ser. No. 462,094
Claims priority, application France, Apr. 29, 1965, 15,180
6 Claims. (Cl. 260—397.4)

ABSTRACT OF THE DISCLOSURE

A process for producing 17-alpha-hydroxy-progesterone heptylate by esterifying 17-alpha-hydroxy-progesterone with heptylic anhydride. The esterification is catalyzed by 4–10% by weight of p-toluene sulphonic acid and the amount of heptylic anhydride is about 1–1.5 mols per mol of starting material. Esterification is effected for 24–30 hours at 40–65° C.

---

This invention relates to a process for the preparation of 17-alpha-hydroxy-progesterone heptylate.

A known process for the esterification of 17-alpha-hydroxy-progesterone consists of treating the harmone with a large excess of acid anhydride in the presence of p-toluene sulphonic acid. The enolic diester is first formed and this can be isolated and hydrolyzed, preferably under acidic conditions, to give the desired monoester.

Attempts to use this excellent laboratory technique on an industrial scale for the preparation of the heptylate of 17-alpha-hydroxy-progesterone require consumption of large amounts of the reactants and it becomes, for this reason, very expensive.

I have now found, however, that the conventional process can, in the case of this ester, be simplified in the following respects.

(1) It is possible to avoid the intermediate formation of the enolic diester by reducing the quantity of heptylic anhydride used to form 1 to 1.5 mol of the anhydride per mol of progesterone starting material; this slight excess is sufficient to obtain quantitative and preferential esterification of the hydroxyl group in the 17-alpha position. There are no indications of this effect in the literature.

(2) It is possible to dilute the reaction mixture very greatly by the addition of an inert organic solvent in which the ester formed is only slightly soluble, such as isopropyl ether.

(3) The use of an amount of p-toluene sulphonic acid corresponding to the weight of hormone used is not only useless, but is in fact undesirable because the reaction products become very colored and their purification is all the more complicated. The best results are obtained with quantities of from 4 to 10% of the weight of the hormone, which, after destruction of the excess acid anhydride by the addition of methanol, enables a very pure ester to be obtained by simple crystallization.

It is also possible to carry out the destruction of the excess anhydride in a second stage after separating the crystals formed by cooling the reaction medium.

(4) The filtrate still contains appreciable quantities of product in solution; the greater the proportion of anhydride used, the greater being the quantity of product remaining in the filtrate. This 17-alpha-hydroxy-progesterone heptylate can be recovered by simple crystallization after evaporation of the filtrate, preferably neutralized, under reduced pressure and this avoids the long and tedious steam distillation which is recommended in the conventional process.

(5) Under the conditions summarized above, the reaction can be effected at a temperature of from 40° to 65° C. and is complete in from 24 to 30 hours.

The improved method is applicable to the industrial production of 17-alpha-hydroxy-progesterone heptylate under conditions of very good profitability and gives yields of the pure product exceeding 80%.

The method is illustrated by the following examples.

Example 1

330 grams of 17-alpha-hydroxy-progesterone (1 mol) were introduced into a flask provided with an agitator and an inlet for nitrogen and containing a solution of 16.5 g. of p-toluene sulphonic acid (that is 5% of the weight of the hormone) in 349 g. of heptylic anhydride (1.44 mol).

The mixture was agitated under a stream of nitrogen and the flask was heated progressively to 50° C., the reaction being slightly exothermic. The heating was regulated to maintain this temperature. The hormone gradually dissolved to give a thick, colored liquid. After heating for 30 hours, the esterification was complete. 165 ml. of methanol were then added. The temperature was raised to 65° C. and the reaction mixture was maintained for 1½ hours at this temperature and was then progressively cooled with agitation. Crystals formed abundantly. After being left overnight in a refrigerator, the crystals were separated from the reaction mixture, washed with a little methanol and dried at 60° C.

Recovered _____ g__ 49
Total yield _____ percent__ 84.4
M.P. _____ °C__ 115

Example 2

330 grams of 17-alpha-hydroxy-progesterone (1 mol) were treated as in Example 1, in the presence of 19.8 g. of p-toluene sulphonic acid, which corresponds to 6% of catalyst with respect to the hormone. The reaction was complete in 24 hours at 55–60° C. After addition of 165 ml. of methanol and heating for 1½ hours at 65° C., the reaction mixture was crystallized in a refrigerator. The separated crystals were washed with methanol and dried; they weighed 371 g. corresponding to a yield of 83.9%. Melting point, 116° C.

The filtrate, concentrated as in Example 1, gave 19 g. of crystals, M.P. 116° C. The total yield was therefore 88.2%.

Example 3 (industrial operation)

8,700 grams of 17-alpha-hydroxy-progesterone (26.4 mol) were treated as in Example 1 with 9,185 g. of heptylic anhydride and 384 g. of p-toluene sulphonic acid (i.e. 4% with respect to the hormone). The mixture was maintained at 40° C. for 24 hours and then at 60° C. for 6 hours. On completion of the reaction, 2.9 litres of methanol were added to the reaction mixture which was then cooled with agitation. The following day, the crystals were separated, washed with 1.450 liters of methanol and dried.

Recovered _____ 6,840 g., i.e. a yield of 58.6%.
M.P. _____ 115° C.

The filtrate was heated to 65° C. for 1½ hours after the addition of 87 g. of p-toluene sulphonic acid, i.e. 1% with respect to the hormone. After cooling, the liquid crystallized and, after separation, washing and drying, 3603 g. of crystals were obtained, i.e. a yield of 30.9%.

The total yield was therefore 89.5%.

Example 4

330 grams of 17-alpha-hydroxy-progesterone (1 mol) were treated as in Example 1 with 315 g. of heptylic anhydride (1.30 mol) in the presence of 16.5 g. of p-toluene sulphonic acid and 50 ml. of dry isopropyl ether. The reaction was complete in 30 hours. After addition of 165 ml. of methanol and heating to 65° C. for 1½ hours, the reaction mixture yielded 343 g. of crystals, M.P. 116–117° C., i.e. a yield of 77.6%.

8 ml. of pyridine were added to the filtrate and the latter was concentrated under reduced pressure to yield 34 g. of crystals, M.P. 115° C. The total yield of the process was therefore 85.3%.

What is claimed is:

1. A process for the preparation of 17-alpha-hydroxy-progesterone heptylate which comprises esterifying 17-alpha-hydroxy-progesterone in a reaction mixture with heptylic anhydride in the presence of 4–10% by weight based on 17-alpha-hydroxy-progesterone of p-toluene sulphonic acid, said heptylic anhydride being present in an amount of 1–1.5 mols per mol of 17-alpha-hydroxy-progesterone to form directly the 17-mono-ester of 17-alpha-hydroxy-progesterone and recovering the monoester from the reaction mixture.

2. A process according to claim 1 further comprising adding methanol to the reaction mixture at the completion of the esterification to dilute same, crystallizing the monoester is crystallized from the thusly diluted reaction mixture and separating the crystals.

3. A process according to claim 2, wherein a mother liquor is formed after the crystals have been separated and comprising evaporating said mother liquor under reduced pressure and a second crystallization effected to obtain a further quantity of the monoester.

4. A process according to claim 1 wherein the esterification is effected at a temperature of 40° to 65° C. for 24 to 30 hours.

5. A process according to claim 1 wherein the reaction mixture is diluted with an inert organic solvent in which the monoester to be produced is substantially insoluble.

6. A process according to claim 5 wherein the inert organic solvent is isopropyl ether.

References Cited

UNITED STATES PATENTS 2,965,541   12/1960   Byrnes _____ 260—397.4

LEWIS GOTTS, *Primary Examiner.*

JOHNNIE R. BROWN, *Assistant Examiner.*